United States Patent [19]

Gross

[11] 4,121,887
[45] Oct. 24, 1978

[54] MICROFICHE READER WITH IMPROVED CARRIAGE MOUNTING

[75] Inventor: Roger A. Gross, Hartford, Wis.
[73] Assignee: Micron Corporation, Hartford, Wis.
[21] Appl. No.: 799,151
[22] Filed: May 23, 1977
[51] Int. Cl.² .................... G03B 23/08; F16C 29/04
[52] U.S. Cl. ................................... 353/27 R; 308/3.8
[58] Field of Search .......................... 353/27 R, 27 A; 308/3.8, 6 R

[56] References Cited

U.S. PATENT DOCUMENTS

| 2,622,940 | 12/1952 | Johnson | 308/6 R |
| 2,967,741 | 1/1961 | Bostelmann | 308/6 R |
| 3,017,227 | 1/1962 | Thornton | 308/3.8 |
| 3,834,800 | 9/1974 | Bronscomde | 353/27 R |
| 3,836,242 | 9/1974 | Kluver | 353/27 R |

Primary Examiner—Steven L. Stephan
Attorney, Agent, or Firm—Ira Milton Jones

[57] ABSTRACT

A microfiche reader in which the subject to be viewed and by which any selected area thereof can be quickly and easily brought into intersecting alignment with the light beam of the optical system of the machine, is carried by the upper one of two superimposed rigid frames that are mounted on the base of the machine by elongated ball bearing retainers interposed between stationary tracks fixed to the machine base and endwise movable tracks fixed to the lower one of the superimposed rigid frames, for movement in unison across the machine base along one of a pair of coordinate horizontal axes, and connected with one another for relative movement along the other one of said axes by similar elongated ball bearing retainers having rolling engagement with upper and lower tracks respectively fixed to the upper and lower rigid frames.

5 Claims, 13 Drawing Figures

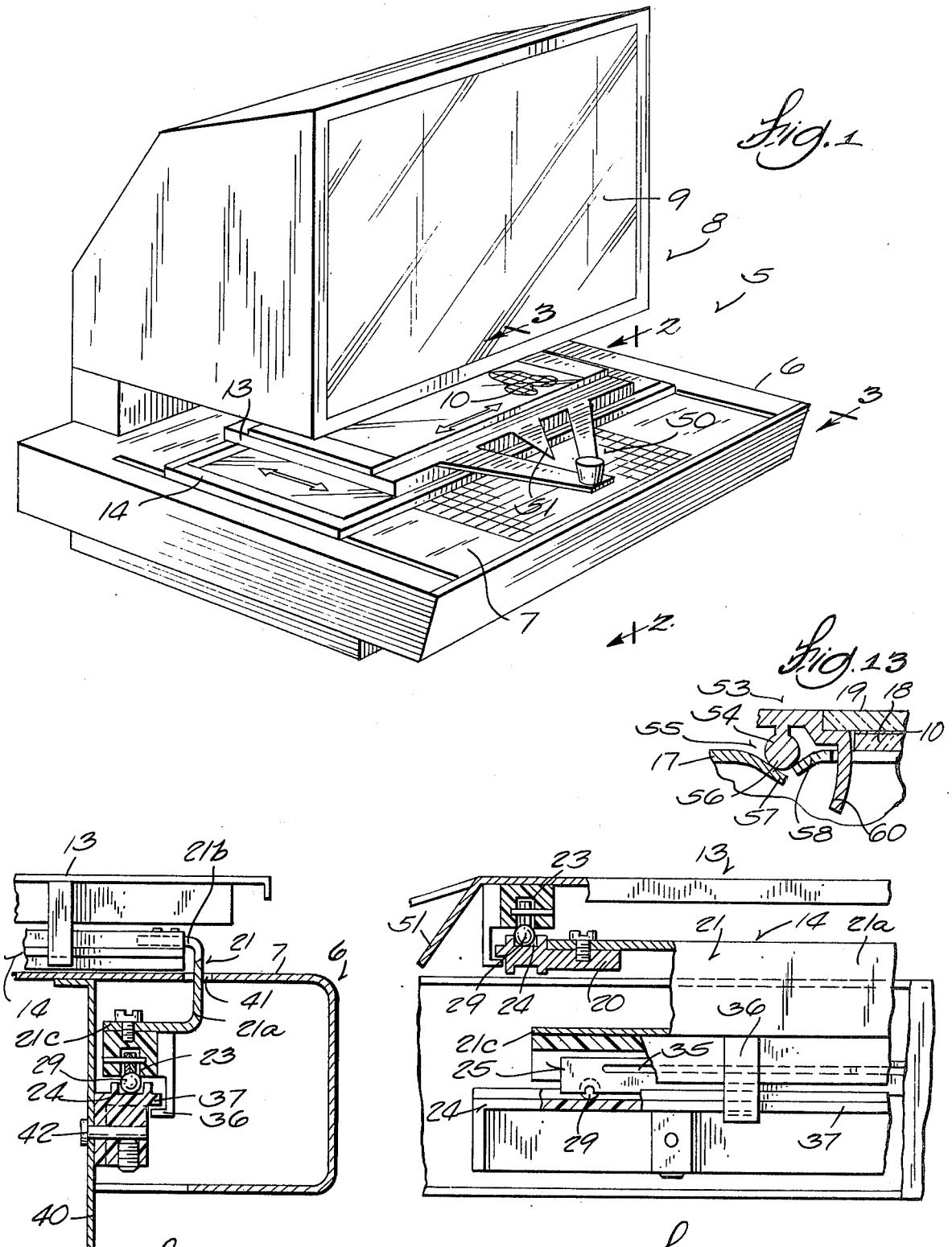

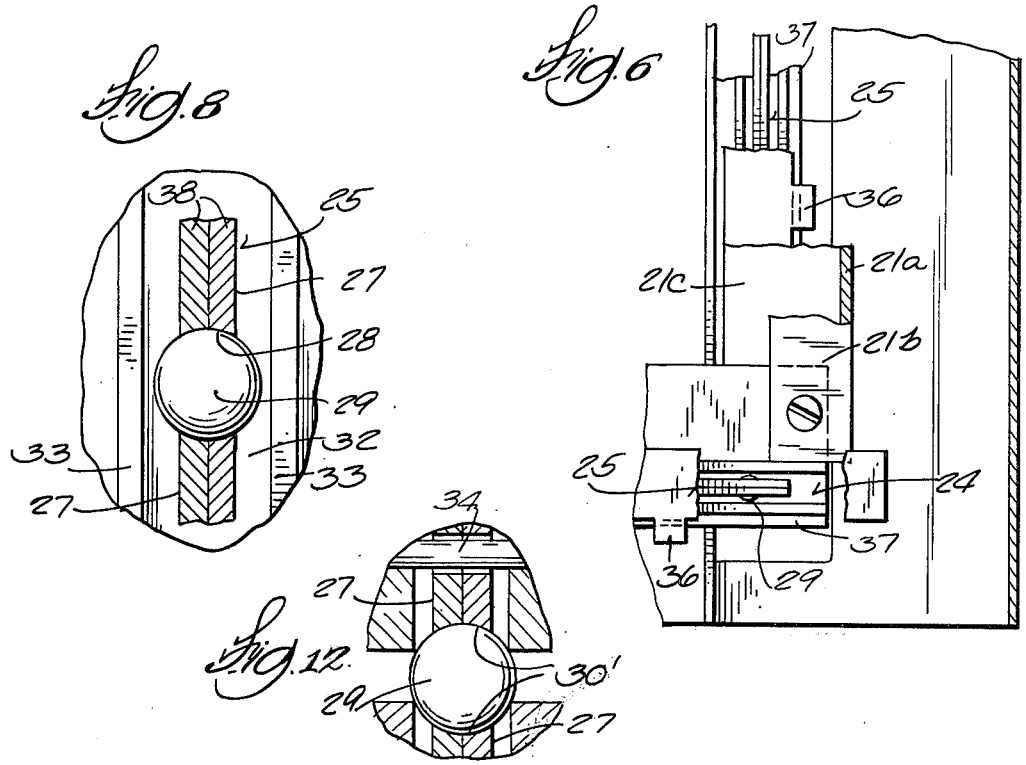
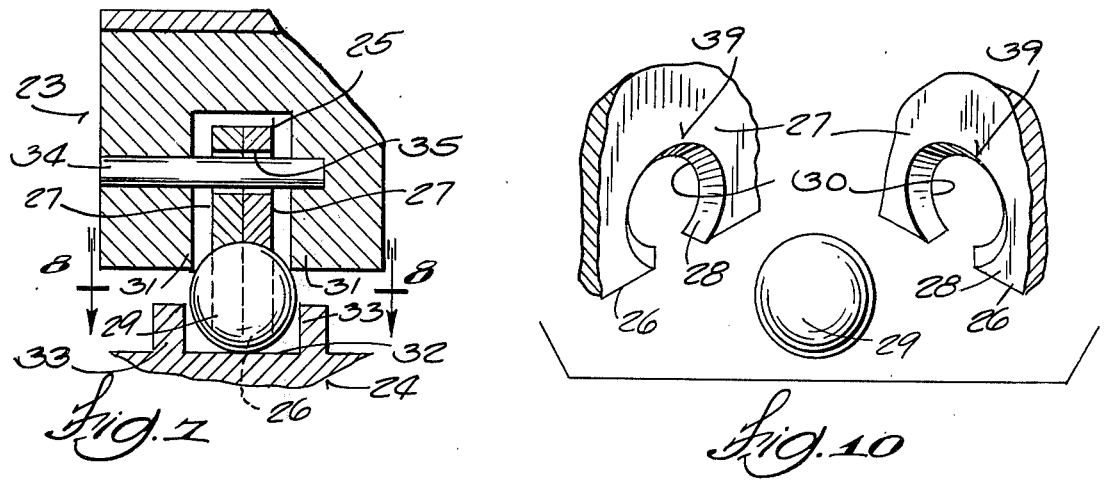
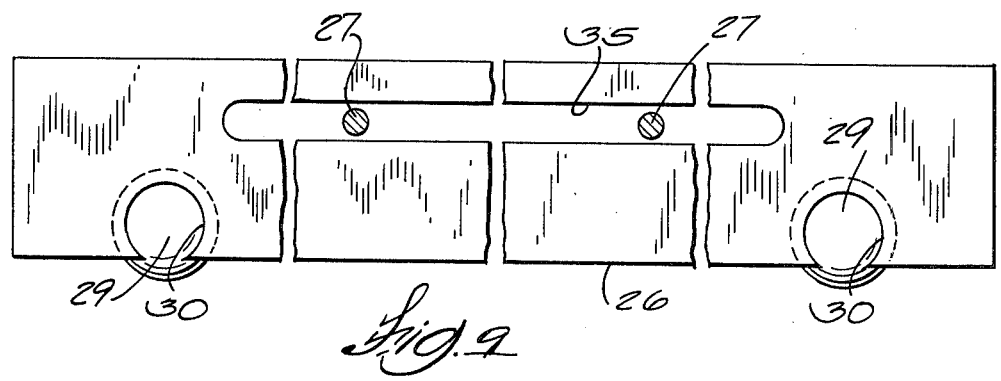

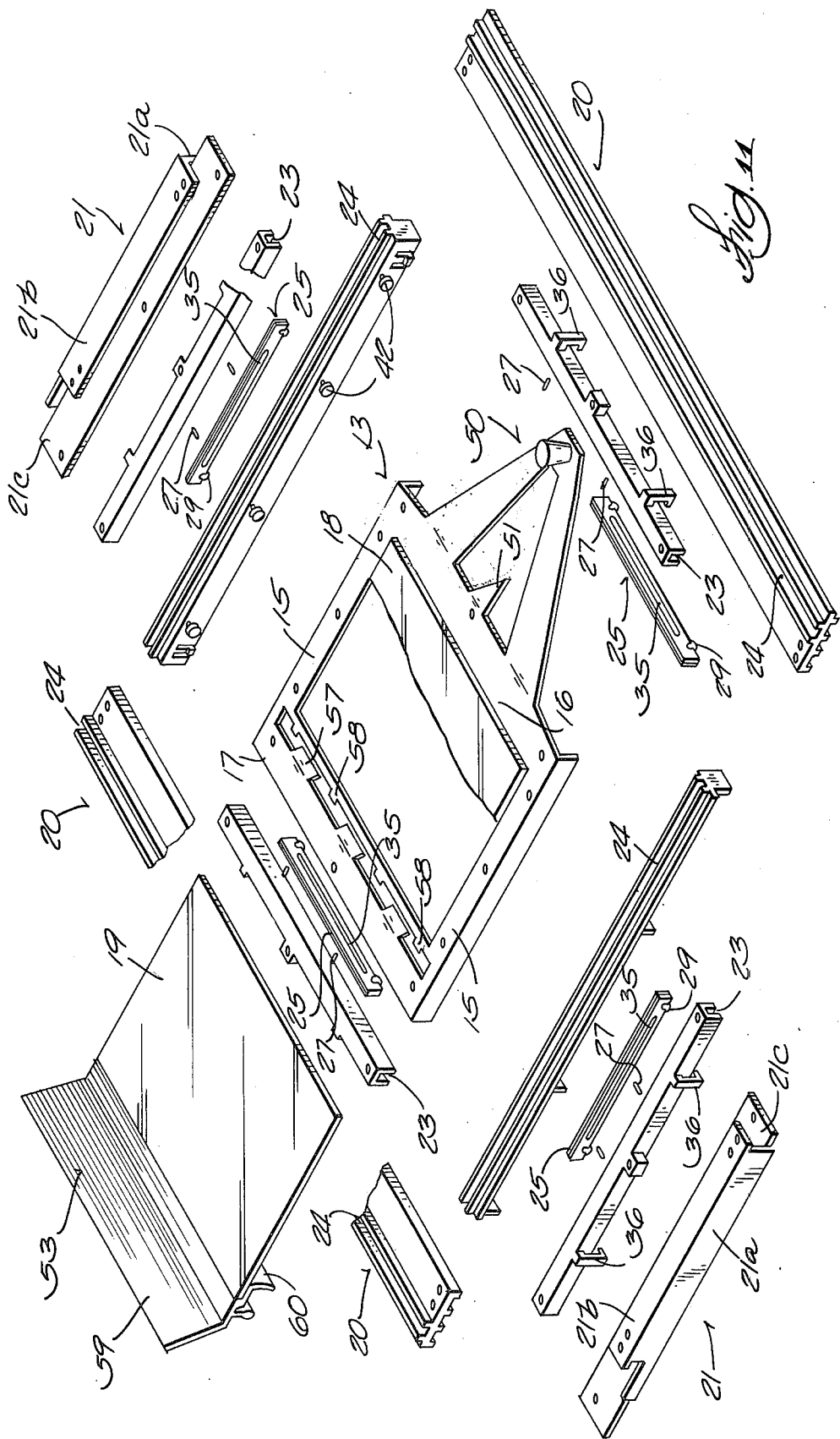

MICROFICHE READER WITH IMPROVED CARRIAGE MOUNTING

This invention broadly relates to information retrieval, but refers more particularly to a machine or instrumentality by which data or information recorded at a very small scale on a transparent card — now commonly called a microfiche — can be projected in greatly magnified proportions onto a viewing screen.

Accordingly, the invention is classifiable with the art represented by such patents as Graef U.S. Pat. No. 3,860,333; Kluver et al. U.S. Pat. No. 3,836,242; Smith U.S. Pat. No. 3,743,399 and Smitzer U.S. Pat. No. 3,733,121.

As in the above identified patents, the present invention utilizes a movable microfiche carrier to bring the area of the microfiche on which the selected date or image is located into intersecting alignment with an optical projection path in the form of a light beam by which the tiny selected image on the microfiche is projected through magnifying lenses onto an appropriately positioned viewing screen.

Also, as in prior microfiche viewers of which those of the identified patents are examples, the carrier for the microfiche includes overlying top and bottom transparent plates between which the microfiche is sandwiched and, to make that placement possible, the top plate has a hinged connection with the bottom plate. While improvement in the manner in which that hinged connection is effected is a feature of this invention, the primary purpose and object of the invention is the attainment of a better and more easily manipulated carriage assembly by which the microfiche carrier can be quickly and accurately moved in whatever direction or directions may be required to bring a selected area of the microfiche — as identified on a reference grid — into intersecting alignment with the focal axis of the machine.

For the attainment of the aforesaid objective, greatly improved slideways mount superimposed upper and lower frame members (the upper one of which carries the microfiche) on the base of the machine for fore and aft movement in unison along one of a pair of coordinate axes, and for side-to-side movement relative to one another along the other one of said coordinate axes.

More specifically, it is a feature of the invention that each of the aforesaid slideways comprises a first set of upper and lower parallel tracks, respectively fixed to the upper and lower frame members, a second set of upper and lower parallel tracks respectively fixed to the lower frame member and the base of the machine, and an elongated ball retainer between the upper and lower parallel tracks of each set thereof. Each ball retainer has at least two reentrantly-shaped ball receiving pockets at spaced locations along the length thereof, with mouths that are too small to permit the balls in the pockets to escape, but large enough to allow substantial portions of the balls to protrude from the mouths. Each pocket has either two mouths — one opening to each of the opposite side surfaces of the ball retainer — or three mouths, the third opening to the bottom of the ball retainer. In either case, vertically spaced surface portions of the balls have rolling contact with the upper and lower parallel tracks.

Still another feature of the invention resides in the specific design and construction of the elongated ball retainers and in the upper and lower parallel tracks. At least one of these tracks is of such cross section that it embraces the associated elongated ball retainer and provides laterally spaced rails which rollingly engage the surface portions of the balls protruding from its opposite sides. The other track, if not of the same form, presents a flat surface on which the lower protruding portion of the balls roll. In either event, the rolling contact between the balls and at least one of the tracks has a diameter less than that of the balls. This relationship between the balls and the tracks assures smooth guidance for the relative motion between the upper and lower frame members, and for the fore and aft motion in unison, of the superimposed frame members across the base of the machine. It also has the advantage of enabling reduction in the length of each lower track without concomitantly reducing the distance the structure riding on the lower track can be moved.

Towards the attainment of a neat uncluttered appearance, all of the structure by which the lower one of the superimposed upper and lower frame members is mounted for fore and aft movement, is located beneath the top wall of the base of the machine.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 1 is a perspective view of a microfiche viewing machine embodying this invention;

FIG. 2 is a vertical sectional view through the right-hand side portion of the base of the machine, taken substantially on the plane of the line 2—2 in FIG. 1;

FIG. 3 is a vertical sectional view through the fore part of the base of the machine, taken substantially on the plane of the line 3—3 in FIG. 1;

FIG. 6 is a fragmentary top view with parts thereof broken away and shown in section, of a corner portion of the carriage assembly of the machine;

FIG. 7 is a detail cross sectional view through one of the slideways by which the component parts of the carriage assembly are slidingly supported one on the other;

FIG. 8 is a detail sectional view through FIG. 7 on the plane of the line 8—8;

FIG. 9 is a side view of one of the elongated ball retainers that form an essential part of the slideways;

FIG. 10 is a perspective view illustrating a detail of the elongated ball retainers;

FIG. 11 is an exploded perspective view of the components of the carriage assembly;

Figure 4:
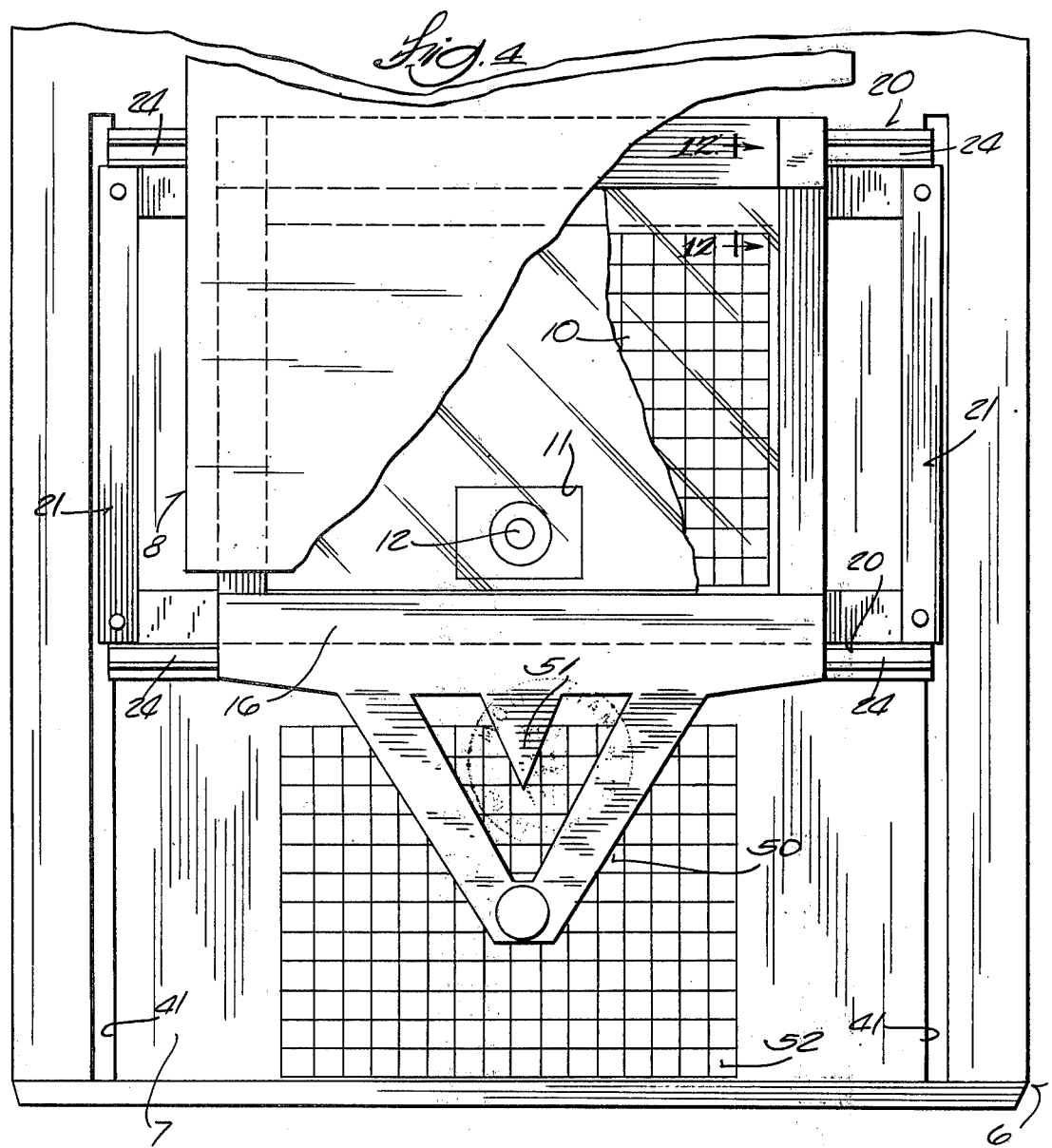
FIG. 4 is a top view of the machine with parts thereof broken away.
Figure 5:
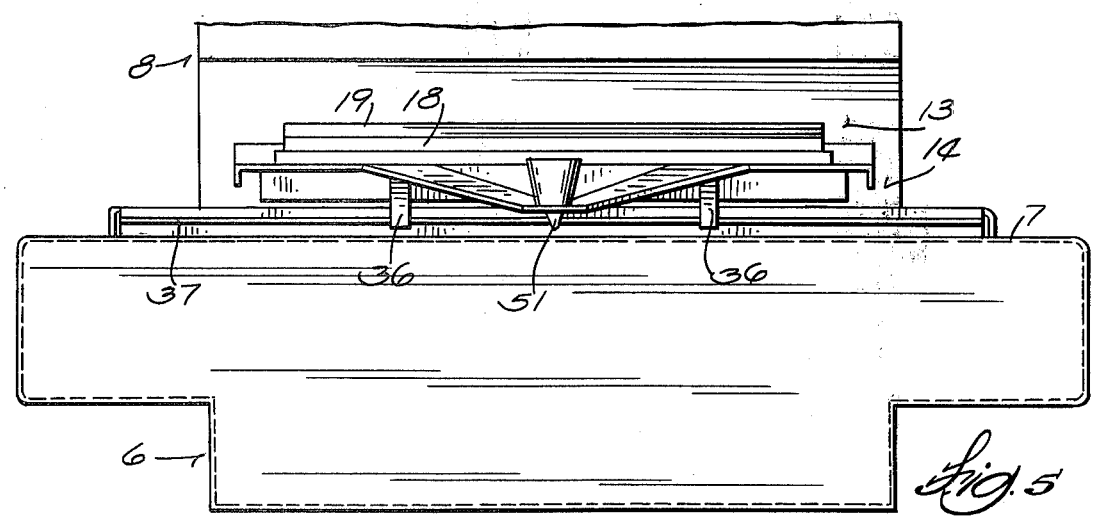
FIG. 5 is a front view of the lower part of the machine.

FIG. 12 is a detail cross sectional view similar to FIG. 2, but illustrating a track and ball retainer design different from that employed in the machine depicted in FIGS. 1 through 11; and FIG. 13 is a detail cross sectional view through the hinged connection between the upper and lower transparent plates between which the microfiche is sandwiched, taken substantially on the plane of the line 13—13 in FIG. 4, Referring to the drawings in which like numerals denote like parts, the numeral 5 designates generally the microfiche viewer of this invention and which has a hollow base portion 6 with a top wall 7 and a hollow enclosure 8 rising from the rear of the base portion. The front wall 9 of this hollow enclosure constitutes a screen onto which an optically magnified image of a selected area of a microfiche 10 is projected. The optical system by which this magnified projection is accomplished forms no part of this invention and hence is not illustrated, though it should be understood that the system — most of which is housed in the enclosure 8 — includes a light source in the base 6 from which a focused beam of light projects vertically through a window opening 11 in the top wall 7 of the base and into a condensing lens 12 from which it passes through the area of the microfiche in line with the opening 11. The light beam, carrying the image of the selected area of the microfiche — after being passed through the series of lenses and reflected by the mirrors that collectively constitute the optical system (not shown) — impinges upon the screen 9 to there display a greatly magnified image of the selected area of the microfiche.

The part of the optical system that is important to this invention is the fixed relationship between the axis of the vertically projected light beam and the base of the machine. This, of course, means that for a selected area of the microfiche to be projected onto the screen, the microfiche must be moved or shifted horizontally as required to bring that selected area into intersecting alignment with the light beam. The means by which that motion is accommodated constitutes the essence of this invention.

The structure that comprises the means by which the microfiche can be shifted to bring a selected area thereof into position to be projected onto the screen comprises superimposed upper and lower frame members 13 and 14 that are slidably connected for movement relative to one another along one of a pair of coordinate horizontal axes which is transverse to the machine base and movable in unison fore and aft across the base 6 of the machine along the other one of said coordinate axes.

The upper frame member consists of a rectangular metal stamping (best seen in FIG. 11) that has parallel side rails 15 connected by front and rear cross bars 16 and 17 and a transparent plate 18 mounted thereon. The microfiche is laid on this transparent plate and is held in place by being sandwiched between it and a transparent cover plate 19 that is detachably hinged to the rear cross bar 17. The lower frame member 14 comprises a pair of front and rear rails 20 rigidly connected by parallel side rails 21. To enable the slideway structure by which the lower frame member is mounted for fore and aft movement to be located below the top wall 7 of the base, the side rails 21 are channel-shaped in cross section, with the web 21a thereof vertical and its flanges 21b and 21c horizontal. The manner in which this U-shaped formation of the side rails 21 makes possible the location of the slideway structure for the lower frame member beneath the top wall 7 of the case, will be described later.

Between the front and rear crossbars (16-17) of the upper frame member 13 and the front and rear rails 20 of the lower frame member 14 — and also between the side rails 21 of the lower frame member and the base of the machine — there are ball bearing type slideways, each of which comprises an upper track 23, a lower track 24 and an elongated ball retainer 25 between the upper and lower tracks.

The ball retainers are elongated stick-like members, rectangular in cross section, with a flat bottom surface 26 and opposite flat side surfaces 27. Near the ends of the elongated stick-like ball retainers there are pockets 28, each of which freely rotatably contains a ball 29.

The pockets 28 have a reentrant shape with mouths 30 that open to the bottom and opposite side surfaces of the ball retainer. These mouths are too small to permit the balls to leave the pockets, but large enough to allow substantial portions of the balls to protrude beyond the side surfaces of the ball retainers and from the bottom thereof, as illustrated in FIGS. 7, 8 and 9.

As best seen in FIGS. 7 and 8, each upper track 23 has an inverted U-shaped cross section, the flanges of which form parallel rails 31. The distance between the inner faces of these rails is sufficient to accommodate the ball retainers but less than the diameter of the balls — hence, the inner lower edges of the rails ride on the portions of the balls that protrude beyond the opposite side surfaces of the elongated ball retainers. While the diameter of that rolling contact between the balls and the upper track 23 resulting from this dimensional relationship between the balls and the upper track is less than that of the balls, it is nevertheless sufficient to result in the upper tracks moving faster and farther than the ball retainers embraced thereby during any motion of the upper tracks.

With the lower track 24 as employed in the embodiment of the invention shown in FIGS. 1 through 11, the diameter of the rolling contact between the balls and the track is the same as that of the balls, since in this case the balls ride on a flat upwardly facing surface 32. The width of this surface is defined by parallel fences 33 which are spaced apart a distance only slightly greater than the diameter of the balls. Hence, endwise motion of the elongated ball retainers along the lower tracks is fairly well constrained to a straight line; and since it is the laterally spaced inner edges of the parallel rails 31 of the upper tracks that ride on the balls, there can be no relative lateral displacement between the upper tracks and the elongated ball retainers. Accordingly, a smooth well defined straight line motion of each upper track with respect to its companion lower track is assured.

To prevent disassembly of the component parts of the slideways, pins 34 received in aligned holes in the rails 31 of the upper tracks pass through elongated slots 35 in the ball retainers; and inturned fingers 36 that are fixed with respect to the upper tracks engage under longitudinally extending ledges 37 on the lower tracks — as best seen in FIGS. 2 and 3. The pins 34 not only hold the elongated ball retainers assembled with the upper tracks but, by colliding with the ends of the slots 35, define the limits of relative endwise movement between the ball retainers and the upper tracks.

The design and construction of the elongated ball retainers is another unique feature of the invention since it makes possible the reentrant shape of the ball receiving pockets required to keep the balls freely rotatably caged while portions thereof protrude beyond the sides and bottom of the ball retainers. To achieve that objective, each elongated retainer consists of two identical flat-surfaced molded plastic strips 38 that are rectangular in cross section and suitably adhered together. During the molding of these strips, recesses 39 are formed in one face thereof. These recesses have spherical surfaces of slightly larger diameter than the balls. The recesses are so located with respect to the cross section of the strips that they break through one edge and one face of the strips, as shown in FIG. 10. When the strips are joined, the recesses align with one another to form the reentrantly-shaped pockets. Obviously, before the strips are joined a ball is placed between each of the opposing recesses. Accordingly, when the strips 38 are secured together, the balls are neatly caged in their respective pockets and the interface of the adhered surfaces of the mating strips lies in a plane that is equispaced from the outer side surfaces of the joined strips and contains the centers of the balls.

If the lower track and ball retainer design illustrated in FIG. 12 is used, the possibility of transverse relative motion between the ball retainers and both the tracks is completely eliminated, for in this case the rolling contact between the balls and both tracks is at the opposite sides of the ball retainer. Obviously, of course, in this case the mouths 30' of the reentrant pockets open only to the opposite side surfaces of the elongated ball retainers, and the lower track as well as the upper track slidably embraces the ball retainers.

Although both frame members are located above the top wall 7 of the base, the U-shaped cross section of the side rails 21 of the lower frame member, and the fact that the front and rear rails 20 of this frame member are secured to the lower flanges of the side rails, enables the entire slideway structure by which the lower frame member is mounted for fore and aft movement to be located beneath the top wall 7. To that end, the hollow base of the machine — which is formed of suitably connected stampings — includes parallel forwardly and rearwardly extending vertical walls 40 fixed to the underside of the top wall 7 laterally inward of parallel slots 41 in the top wall 7. The webs 21a of the side rails 21 travel in these slots as fore and aft motion is imparted to the carriage.

The lower tracks of the slideways on which the lower frame member rides are fixed to the walls 40 by headed pins 42 which pass through these walls to be anchored in holes in the tracks, as best seen in FIG. 2. Also, as best depicted in that view, the upper tracks of these fore and aft slideways are fixed to the bottom flanges 21c of the U-shaped side rails 21.

The slideways by which the upper frame member is mounted for side-to-side movement across the lower frame member is of course located above the top wall 7 of the base, as best seen in FIG. 3. The lower tracks 24 of these slideways are integral parts of the front and rear rails 20 of the lower frame member, and the upper tracks 23 are suitably secured to the underside of the front and rear crossbars 16 and 17 of the upper frame member.

The described components of the carriage assembly coact to provide a smoothly functioning carrier for the microfiche by which any selected area thereof can be quickly and easily brought into intersecting alignment with the upwardly projected light beam of the optical system by simply moving the upper frame member (on which the microfiche is placed) with or without concomitant motion of the lower frame member, along either or both of the coordinate horizontal axes; and to facilitate imparting that resultant motion to the upper frame member to bring a selected area of the microfiche into viewing position, a handle 50 projects forwardly from its front crossbar 16 of the upper frame member and a downwardly directed pointer 51, also on the front crossbar 16, coacts with a reference grid 52 mounted on the base 9.

As explained hereinbefore, the microfiche is sandwiched between the transparent plate 18 that forms a fixed part of the upper frame member and the transparent cover plate 19 hinged thereto.

The transparent cover plate 19 is fixed to and projects forwardly from a generally angle-shaped crossbar 53 which can be a molded plastic part and, while the specific formation of the hinge connection between the two transparent plates is subject to modification, that of this invention is exceptionally convenient. As shown in FIG. 13, this hinge connection comprises a downwardly projecting rib 54 extending along the rear edge of the angle-shaped crossbar 53 to be received in a slot 55 in the rear crossbar 17 of the upper frame member. The bottom edge of this rib forms a bead 56 that rockably rests on fingers 57 and 58 projecting from the opposite edges of the slot.

An upwardly projecting wing 59 on the crossbar 53 is engageable with an abutment (not shown) at the underside of the enclosure 8 to tilt the upper transparent plate upwardly as the upper frame member is pulled forward, and thereby automatically expose the microfiche and facilitate its removal and replacement; and a downwardly directed curved flange 60 on the crossbar 54, the curvature of which is concentric to the hinge axis, projects through a slot between the rear edge of the transparent plate 18 and the rear crossbar 17 to serve as a guide when the upper cover plate is raised and against which the microfiche may be engaged to identify its proper location.

Those skilled in the art will appreciate that the invention can be embodied in forms other than as herein disclosed for purposes of illustration.

The invention is defined by the following claims:

I claim:

1. A microfiche reader in which the microfiche is carried by a table consisting of a transparent plate in a rectangular upper frame having front and rear parallel cross members connected at their ends by parallel side members, characterized by an improved mounting for the microfiche carrying table by which said table is freely movable horizontally in any direction across a supporting structure which has spaced apart side edges and front and rear edges, to enable any selected area of a microfiche on the table to be brought into intersecting relation with a vertical light beam that has a fixed positional relationship to the supporting structure, said improved mounting comprising:

A. laterally spaced parallel track members on the supporting structure adjacent to the side edges thereof and in fixed fore and aft extending relation thereto, said track members having upwardly opening longitudinally extending grooves which form the lower one of paired upper and lower tracks of fore and aft extending ball bearing slideways;

B. a lower rectangular frame consisting of front and rear parallel rails rigidly connected at their ends to parallel side members, said front and rear parallel rails being identical with one another and having a uniform cross section shaped to provide upwardly opening longitudinally extending grooves that form the lower one of paired upper and lower tracks of laterally extending ball bearing slideways;

C. an upper track for each of said ball bearing slideways, all of said upper tracks having identically the same inverted U-shaped cross section to form a downwardly opening longitudinally extending groove with parallel uniformly spaced inner edges that form the upper track of said fore and aft and of said laterally extending ball bearing slideways;

D. means securing the upper tracks of the fore and aft extending ball bearing slideways to the underside of the side members of the lower rectangular frame;

E. means securing the upper tracks of the laterally extending ball bearing slideways to the underside of the front and rear cross members of the upper frame;

F. an elongated ball retainer longitudinally movably received in each of said ball bearing slideways with a part thereof in each of the upwardly opening and downwardly opening grooves that define the upper and lower tracks of said slideways, each of said ball retainers having top, bottom and side surfaces and each having at least two ball cages with mouths that open at least through the side surfaces thereof;

G. a ball freely rotatably confined in each of said cages and protruding from the mouths thereof, the protruding portions of the balls having rolling engagement with both the upper and the lower tracks of their respective slideways; and H. retaining means for each of said ball bearing slideways by which their respective paired upper and lower tracks are held against vertical displacement from cooperative rolling engagement with the balls therebetween.

2. In a microfiche reader, the improvement defined by claim 1, wherein the ball cages of said elongated ball retainers also have mouths that open through the bottom thereof, the dimensional relationship between the diameter of the balls and the size of their cages being such that every ball protrudes beyond both sides and the bottom of the ball retainer in which it is located, and wherein the portions of the balls that protrude beyond the sides of the ball retainers have rolling engagement with the inner edges of the downwardly opening longitudinally extending grooves that form said upper tracks, while the portions of the balls that protrude from the bottoms of the ball retainers have rolling contact with the bottom of the upwardly opening grooves that form said lower tracks.

3. In a microfiche reader, the improvement defined by claim 1, wherein said retaining means comprises a lengthwise extending surface on one of each pair of upper and lower tracks facing away from the other one of the pair, and a part on said other one of the pair of upper and lower tracks overlying said lengthwise extending surface.

4. In a microfiche reader, the improvement defined by claim 1, wherein each elongated ball retainer moves lengthwise with respect to the upper and lower tracks between which it is interposed, further characterized by stop means reacting between each upper track and its associated elongated ball retainer to limit relative endwise motion therebetween.

5. The invention defined by claim 1, wherein said stationary supporting structure is a hollow base, said hollow base having a flat top wall with a pair of fore and aft extending slots therein, wherein said superimposed frame members are located above said top wall of the hollow base, wherein said laterally spaced parallel track members (paragraph A of claim 13) are fixed to a portion of the hollow base beneath its top wall and parallel with the slots therein, wherein the side members of said lower rectangular frame are channel-shaped in cross section, wherein the webs of said channel-shaped side members pass through the slots in the top wall of the hollow base and the flanges thereof are above and below said top wall, wherein the upper ones of the paired upper and lower tracks of the fore and aft extending ball bearing slideways are fixed to the flanges of said channel-shaped side members that lie below the top wall of the base, and wherein said front and rear parallel rails of the lower rectangular frame are fixed to the flanges of said U-shaped side rails that lie above the top wall of the base.

* * * * *